Feb. 3, 1970  G. A. FRANCIS  3,493,720
HEATER FOR AEROSOL FOAM-DISPENSING CONTAINERS
Filed Dec. 19, 1967
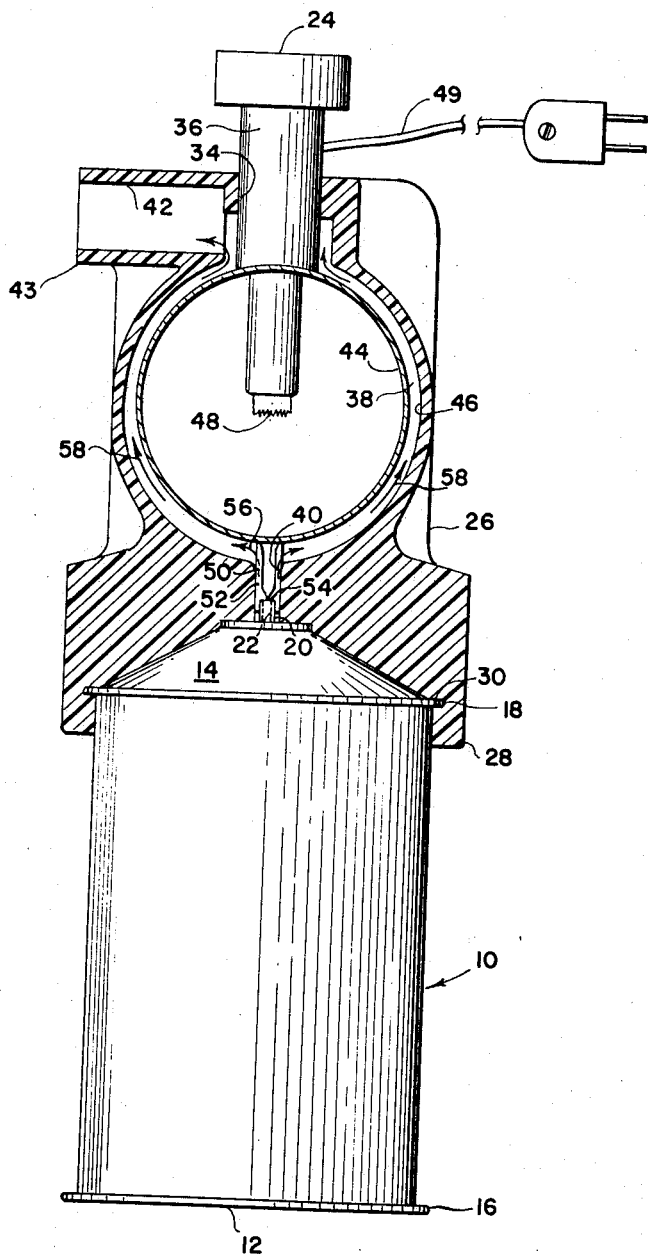
INVENTOR
GERALD A. FRANCIS
BY Morgan, Finnegan, Durham + Pine
ATTORNEY

United States Patent Office 3,493,720
Patented Feb. 3, 1970

3,493,720
HEATER FOR AEROSOL FOAM-DISPENSING CONTAINERS
Gerald A. Francis, Columbus, Ohio, assignor to Carter-Wallace, Inc., New York, N.Y., a corporation of Maryland
Filed Dec. 19, 1967, Ser. No. 691,882
Int. Cl. H05b *1/00;* F24h *1/10*
U.S. Cl. 219—214     5 Claims

ABSTRACT OF THE DISCLOSURE

A heating device for heating foam shaving lather as it is discharged from the outlet of a valve-actuated aerosol container includes a hollow housing having an inlet means communicating with the outlet of the container, electric heating means within the housing for heating the foam and an outlet for discharging the heated foam. The heating means comprises a metal shell enclosing a high temperature filament heater. The heating means is selectively movable within the housing by means of a manual actuator extending exteriorly of the housing. The heating means carries a plunger member engageable with the valve actuator of the container, whereby upon manual movement of the heating means, the plunger is depressed to open the container valve to allow foam to flow into the housing through the inlet.

---

This invention relates to a heating device for aerosol containers, and more particularly to a heating device that can be interconnected with the discharge opening of the aerosol container for rapidly heating foam products, such as foam shaving lather and the like, as they are discharged from the container.

Conventional aerosol containers use a propellant gas to discharge foam products from their containers. Generally, the propellant gas is dispersed throughout the product under pressure and in liquefied form. Upon release of the discharge outlet of the container, the propellant gas forces the product out of the container and simultaneously expands to form gas bubbles and generate the foam.

Expansion of the propellant from a liquid to a gas, however, has a cooling effect on the foam product. This cooling effect is particularly undesirable in shaving lathers, because cold shaving lather foams are not only uncomfortable but also are slow in softening the beard for the shaving operation. Human hair is more easily shaved after it has been softened by the penetration of moisture from the lather, and this softening effect increases with increasing lather temperature.

For this reason numerous heating devices have been proposed for heating foam shaving lathers as they are discharged from their containers. Some of the proposed devices use electrical heating elements to heat a conduit or tube through which the foam passes. Generally, the electrical heating element comprises an electrical resistance wire which surrounds the outside of the tube and indirectly heats the foam lather as it passes through the tube.

These electrical heating devices, however, have generally not proven entirely satisfactory in heating foam shaving lathers to the desired temperature. Electrical resistance heating devices require a considerable "warm-up" time between the time the heating element is actuated and the time the element and the heat transfer tube become hot enough to heat the foam. Further, electrical resistance heating elements require a high power level to raise the heating elements to the desired operating temperature. Such devices also have the disadvantage of becoming too hot and overheating the foam and the heating device through which the foam passes, unless additional controls are provided to control the flow of power to the heating element.

It is therefore desirable to provide a new and improved heating device for aerosol containers that heats up instantaneously, rapidly transfers heat to the foam as it is discharged from the container, operates on a relatively low power level, and is self-regulating without the need for additional controls to prevent overheating of the foam or the device.

Accordingly, it is a primary object of this invention to provide a new and improved heating device for heating foam products as they are discharged from aerosol containers.

Another object of this invention is to provide a new and improved electrical heating device that operates on a relatively low power level and that rapidly heats foam shaving lather as it is discharged from an aerosol container to a temperature substantially above room temperature.

Still another object of this invention is to provide an improved, self-regulating, electrical heating device for rapidly heating foam shaving lather that avoids danger of overheating the foam.

A further object of this invention is to provide an electrical heating device for rapidly heating foam shaving lather that uses a high temperature filament heater to heat the foam.

Yet a further object of this invention is to provide an improved electrical heating device for heating foam shaving lather that can be detachably interconnected with the discharge opening of an aerosol container, that is adaptable to all sizes of aerosol containers, that is inexpensive to manufacture, that is rugged, simple in construction, and is convenient in use.

Additional objects and advantages of this invention will be set forth in part in the description which follows, and in part will be obvious from the description or may be learned by practice of the invention, the objects and advantages being realized and attained by means of the instrumentalities, devices, and combinations particularly pointed out in the appended claims.

To achieve the foregoing objects and in accordance with its purpose, this invention, as embodied and broadly described, comprises a heating device for heating foam shaving lather as it is discharged from the outlet of a valve-actuated aerosol container. The heating device includes: a housing having a chamber for conducting foam through the housing; housing inlet means communicating with the outlet of the container for conducting foam discharged from the container into the chamber; housing outlet means for discharging heated foam from the chamber; and foam heating means located within said chamber, said foam heating means comprising a metal shell of heat conductive material exposed to the flow of foam through said chamber and a high temperature filament heater located within said shell, said filament being connectable to a supply of electrical energy.

The accompanying drawing which is incorporated in and constitutes a part of this specification, illustrates an embodiment of the invention and, together with the description, serves to explain the principles of this invention.

The sole figure of drawing is a sectional elevation of the heating device of this invention mounted to the top of an aerosol container.

It is to be understood that both the foregoing general description and the following detailed description are exemplary and explanatory but are not restrictive of the invention.

Reference will now be made in detail to the present preferred embodiment of the invention, an example of which is illustrated in the accompanying drawing.

The present invention provides an electrical heating device for aerosol containers that uses a high temperature filament heater to rapidly heat foam shaving lather as the lather is discharged from the container.

A typical aerosol container 10 is shown in the drawing. Container 10 has a bottom 12 and a lid 14, each provided with a peripheral curl 16 and 18, respectively, to secure them to the container. Lid 14 has a central opening in its top for discharge of the foam product from the container. The product is maintained in container 10 under the pressure of a propellant gas, allowing discharge of the product through this central opening in the top of the container.

Aerosol container 10 includes a valve actuator 20 having an outlet passage 22. When valve actuator 20 is depressed by actuation of a valve button 24, foam is expelled from the container in a controlled manner. A typical valve construction is described in U.S. Patent 3,171,572 to Reich et al., and reference is made to that patent for a more detailed discussion of the construction and operation of this valve. While the valve construction illustrated in Patent 3,171,572 is suitable for use with the heating device of this invention, it will be understood, of course, that other and different forms of valve mechanisms may also be employed with the present invention.

An embodiment of the heating device of the present invention and its removable attachment to the top of an aerosol container is shown in the drawing. The heating device includes a housing 26 made of plastic that preferably has good stiffness and lightness and good thermal and electrical insulation properties. Suitable plastic materials for construction of the housing include linear polyethylene, polypropylene, polystyrene, or other similar materials.

As shown in the drawing, the bottom of housing 26 is provided with a peripheral annular flange 28, having an internal annular groove 30 that grips peripheral curl 18 of lid 14 for snap attachment of the heating device to aerosol container 10.

As shown in the drawing, the sides of housing 26 extend upwardly and inwardly across the top, forming an enclosure. An aperture 34 is provided in the top of housing 26 and valve button 24, having a valve stem 36, extends through aperture 34 to permit actuation of valve actuator 20 when the heating device is attached to the container, as will be more fully described below. The outer walls of housing 26 provide a spherical chamber 38 that communicates with an inlet passage 40 in the housing and an outlet passage 42 in a spout 43 for discharge of heated foam lather from the housing.

In accordance with the invention, foam heating means are provided within chamber 38 to rapidly heat the foam as it is discharged from the container. As embodied and as shown in the drawing, the foam heating means includes a thin, spherical metal shell 44 of heat conductive material. Shell 44 is mounted on the bottom of valve stem 36 and is spaced slightly apart from the inner wall surfaces 46 of housing 26 to form a spherical passageway that confines the flow of the foam through the chamber to a thin, wide sheet. Shell 44 is sealed and contains a vacuum or an inert gas atmosphere and a high temperature filament heater 48. Heat radiating from filament heater 48 heats shell 44 which, in turn, heats the lather as it passes through the spherical passage way and over the outer surface of the shell.

Filament heater 48 is a fine wire of high resistance, which is heated to incandescence by passage of an electric current through it. The filament can be constructed of carbon, osmium, tantalum, or the like, but preferably is of tungsten, which provides a high temperature at a relatively low power level without disintegration of the filament over prolonged periods of use. High temperature filament heater 48 is electrically connected to a conventional (110 AC) household circuit through electrical cord 49.

A plunger 50 is located within inlet passage 40 of housing 26 and engages the bottom of shell 44 at one end and valve actuator 20 at the other end. Longitudinal grooves 52 are provided in plunger 50, that communicate with outlet 22 of valve actuator 20 and with chamber 38 for conducting the foam discharged by the container into the chamber. Plunger 50 is provided with a shoulder 54 that engages the top of valve actuator 20 to depress it when valve button 24 is depressed by the user of the device.

In operation of the heating device of this invention, the user plugs cord 49 into an electrical outlet which supplies electrical energy to high temperature filament heater 48. The flow of current to filament 48 instantaneously heats the filament to incandescence which radiates heat to heat the enclosing metal shell 44.

After metal shell 44 has reached the required temperature, valve button 24 is depressed, and this, in turn, depresses metal shell 44 (by means of its attachment to valve stem 36) and plunger 50 to actuate valve actuator 20 and discharge foam shaving lather from container 10. The discharged foam passes through outlet 22 of valve actuator 20, through passageways 52 in valve plunger 50, and into spherical chamber 38 in the direction shown by arrows 56. In passing through chamber 38, the foam is formed into a thin, wide sheet by the confining walls of the chamber. Under the pressure of the container, the foam proceeds through chamber 38, in the direction shown by arrows 58, toward outlet passage 42, where it emerges from spout 43.

As the foam passes through chamber 38, a rapid heat transfer occurs through intimate contact of the foam with the outer surface of metal shell 44. Because the product is confined to a thin, wide sheet, intimate contact of the mass of foam with the hot surfaces of the metal shell is assured and the formation of multiple layers of bubbles, which would otherwise act as heat insulators, is reduced. This high rate of heat transfer permits the foam to be discharged from the device at a useful flow rate and at a temperature of from about 130 to 160° F.

The use of a high temperature filament heater permits the required amount of heat to be rapidly generated at a relatively low power input. Further, such high temperature filaments do not burn out over prolonged periods of use and maintain a constant operating temperature without danger of overheating the foam or the device.

The present invention thus provides a heating device for rapidly heating foam shaving lather as it is discharged from an aerosol container. The device uses a high temperature filament to heat a sealed metal shell which encloses the filament. This shell, in turn, heats the lather as it passes over the outer surface of the shell. By increasing the temperature of the lather and thereby increasing its solubility in water, better contact with the beard and increased comfort for the shaver is afforded.

While a separate device for removable attachment to an aerosol container has been illustrated in the accompanying drawing, it will be understood from the above description that the heating device of this invention may also be made a permanent or integral part of the container. Further, it will be appreciated that the heating device can be of any desired shape rather than the spherical configuration shown in the drawing.

The invention in its broader aspects is not limited to the specific details shown and described, and departures may be made from such details within the spirit and scope of the accompanying claims without departing from the principles of the invention and without sacrificing its chief advantages.

What is claimed is:

1. A heating device for heating foam as it is discharged from the outlet of a valve-actuated aerosol container, comprising:
(a) a housing defining a cavity having outlet ports for the coupling of said cavity to the exterior of said housing thus providing a through passage through said housing for the flow of foam wherein said housing additionally defines a groove for detachably affixing said housing to said aerosol container;
(b) foam heating means movably affixed within said housing cavity, said foam heating means being of a configuration identical to the configuration of said housing cavity but having dimensions less than corresponding dimensions of said cavity thus defining a selectively variable narrow chamber between said heating means and said cavity walls through which foam can flow;
(c) initiating means affixed to said heating means and coupled to the exterior of said housing for selectively moving said heating means within said housing cavity; and
(d) means affixed to said heating means and positioned so as to actuate the valve of said foam container upon the actuation of said initiating means wherein said means directs the flow of said emerging foam into said chamber.

2. A heating device for heating foam as it is discharged from the outlet of a valve-actuated aerosol container as described in claim 1 wherein said foam heating means and said housing cavity are both spherical in shape.

3. A heating device for heating foam as it is discharged from the outlet of a valve-actuated aerosol container as described in claim 2 wherein said spherical heating means comprises a metal shell of heat conductive material and a high temperature filament heater located within said shell, said filament being coupled to a supply of electrical energy.

4. A heating device for heating foam as it is discharged from the outlet of a valve-actuated aerosol container as described in claim 3 wherein said high temperature filament is surrounded by an inert gas.

5. A heating device for heating foam as it is discharged from the outlet of a valve-actuated aerosol container as described in claim 3 wherein said high temperature filament is selected from the group consisting of carbon, osmium, tantalum and tungsten.

References Cited

UNITED STATES PATENTS

| | | | |
|---|---|---|---|
| 411,737 | 9/1889 | Smith | 219—315 |
| 446,831 | 2/1891 | Donovan. | |
| 1,409,019 | 3/1922 | Parnell-Smith | 219—306 X |
| 1,692,869 | 11/1928 | Scanlan | 219—315 |
| 3,116,403 | 12/1963 | Carter | 219—214 |
| 3,144,174 | 8/1964 | Abplanalp | 222—146 |
| 3,338,476 | 8/1967 | Marcoux | 219—214 X |
| 3,372,840 | 3/1968 | Kelley | 222—146 |

ANTHONY BARTIS, Primary Examiner

U.S. Cl. X.R.

219—299, 306, 315; 222—146; 239—135